Nov. 17, 1942.   R. B. C. NOORDUYN   2,302,343
SKI ATTACHMENT FOR AIRCRAFT
Filed Oct. 27, 1939
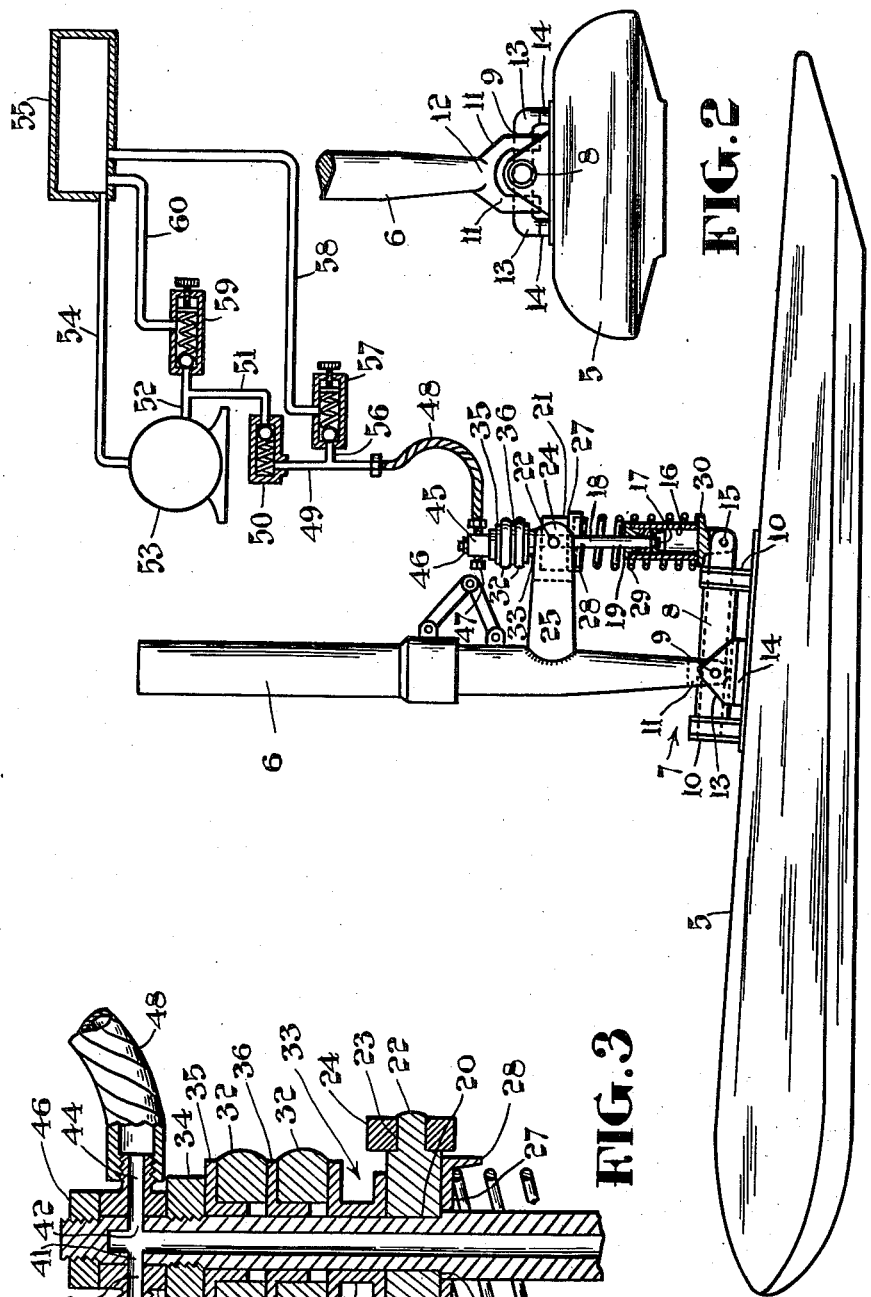
INVENTOR
R. B. C. NOORDUYN
BY Fetherstonhaugh & Co.
ATTORNEYS Patented Nov. 17, 1942

2,302,343

UNITED STATES PATENT OFFICE 2,302,343

SKI ATTACHMENT FOR AIRCRAFT

Robert B. C. Noorduyn, Montreal, Quebec, Canada, assignor to Noorduyn Aviation Limited, Montreal, Quebec, Canada Application October 27, 1939, Serial No. 301,653

11 Claims. (Cl. 244—108)

This invention relates to ski attachments for aircraft and it comprises improved means for maintaining the angle of attack of the skis constant in relation to the body of the aircraft when the latter is in flight. The term "body" as used herein means any part of the aircraft normally above the skis or wheels.

When an aircraft equipped with skis is in flight it is desirable that the skis be held stationary at a predetermined angle in relation to the body of the aircraft, this angle being known as the flight angle or angle of attack. In same cases the skis are held extended at a desired flight angle by rubber cords, springs, or similar devices, which yield, when the skis make contact with or are resting on the ground, to allow the angle of the skis relative to the body of the aircraft to change to suit the angle which the body makes with the ground. The difficulty with such yielding devices is that they must be placed under severe initial stress to apply sufficient force while in flight to restrain the skis against movement in response to the heavy air loads imposed on the skis by manoeuvres of the aircraft. The additional strain on these devices which occurs when the angle of the skis relative to the body is changed by contact with the ground, results in undesirable loads and forces being applied to the aircraft and its structure.

It has also been proposed to provide more or less rigid mechanical locking and releasing means for locking the skis at the proper flight angle during flight and for releasing the skis so that the angle thereof relative to the body may change when the skis are brought into contact with the ground. The chief disadvantage of these latter devices is that, due to incomplete movement of the yielding parts of the undercarriage by which they are operated, they may fail to lock properly when the aircraft leaves the ground or to release properly when the aircraft lands.

According to the present invention the skis are held at the proper flight angle by means of fluid pressure devices, preferably of the cylinder and piston type. These devices are normally extended by the application of sufficient pressure to position the skis at the proper flight angle and to hold the skis against movement in response to air loads applied thereon when the aircraft is in flight. Provision is also made to allow the angle of the skis relative to the body to change when the skis are brought into contact with the ground without imposing corresponding additional loads on the structure. To this end one or more spring loaded non-return relief valves are interposed in a pipe system connecting the fluid pressure devices with a pump or other source of pressure, said valves serving to allow fluid to escape from said devices to a supply tank when the pressure in said devices is increased, above a predetermined value, by contact of the skis with the ground. Suitable non-return valves are also preferably located in the fluid distributing system to prevent any adverse effects on the pump or other source of pressure when the pressure in the fluid pressure ski holding devices is increased by contact of the skis with the ground.

Proceeding now to a more detailed description reference will be had to the accompanying drawing wherein:

Fig. 1 is a diagrammatic view of one form of my invention as applied to an aircraft landing ski.

Fig. 2 is an end view of the ski appearing in Fig. 1.

Fig. 3 is an enlarged vertical sectional view of a portion of the structure appearing Figure 1.

Referring more particularly to the drawing 5 designates a ski hingedly connected to the lower end of an upright 6 forming part of the body of the aircraft. The hinged connection between the ski 5 and the upright 6 may be of any conventional or desired type. In the present instance I have shown, merely by way of example, a hinged connection of the universal type generally indicated at 7. This connection comprises a longitudinally extending pivot 8 and a transversely extending pivot 9. The pivot 8 is rotatably mounted in suitable bearings 10 carried by the ski 5. The pivot 9 passes transversely through the pivot 8 and through the arms 11 of a fork 12 provided at the lower end of the upright 6. The pivot 9 is provided with end members 13 engageable with bumper blocks 14 to limit movement of the ski about the pivot 8.

One end of pivot 8 is connected by pivot pin 15 to the lower end of a cylinder 16 containing a piston 17 equipped with a hollow piston rod 18. The piston rod 18 works in a gland 19 closing the upper end of cylinder 16 and also passes upwardly through a vertical opening 20 (Fig. 3) provided in a trunnion block 21. As here shown block 21 is provided with journals 22 rotating in bearings 23 provided in the arms 24 of a fork formed at the free end of a bracket arm 25 projecting laterally from the upright 6. The upper portion of the piston rod 18 is reduced in diameter to provide a shoulder 26 engaging the lower surface of the trunnion block 21. The lower surface of the trunnion block 21 is also engaged by a spring seat member in the form of a washer 27 provided with a downwardly directed flange 28 surrounding the upper end of a coil spring 29, the lower end of which bears against a flange 30 provided at the lower end of cylinder 16.

Superposed cushioning blocks 32, made of rubber or other suitable resilient material, are clamped in place between a fitting 33 bearing against the upper surface of trunnion block 21 and a clamping nut 34, the latter being threadedly engaged with the piston rod 18 and bearing against a metal washer 35 overlying the upper cushioning block 32. If desired a washer 36, similar to the washer 35, may be interposed as a spacer between the opposing surfaces of the two cushioning blocks 32. The fitting 33 is herein shown as a double flanged washer including a cylindrical neck 37 encircling the piston rod 18, an upper flange 38 bearing against the lower cushioning block 32 and a lower flange 39 resting on the trunnion block 21. The compression of the cushioning blocks 32 between the fitting 33 and the nut 34 serves to normally hold the shoulder 26 of the piston rod 18 in contact with the lower surface of the trunnion block 21. However, the resiliency of the cushioning blocks 32 is such as to permit piston rod 18 to have a slight downward movement relative to the swivel block as the limit of upward movement of the front end of the ski relative to the body is approached.

The bore of the piston rod 18 is closed at its upper end and is provided, adjacent said closed end, with laterally extending ports 41 and 42, these ports communicating respectively with ports 43 and 44 provided in a fitting 45 clamped in place between the clamping nuts 34 and 46. Port 43 serves as a bleeder connection and is normally capped as indicated at 47. Port 43 may also be used as a means of removing air from the system, in installation and maintenance operations.

Port 44 is connected, through flexible tubing 48, line 49, non-return valve 50 and lines 51 and 52 to the pressure side of a pump 53, the suction side of which is connected, through line 54, to a pressure fluid supply tank 55. The supply tank 55 is vented to the atmosphere in any conventional manner (not shown) so that it may freely deliver fluid to the pump 53 and receive fluid from the cylinder 16 through the pipe line 58. Line 49 is also connected to tank 55 by line 56, relief valve 57 and line 58. The pressure side of pump 53 is also connected to tank 55 through pressure regulating bypass valve 59 and line 60. Valve 59 serves as a pressure regulating valve through which excess fluid delivered by the pump is passed directly to the supply tank 52 when the pressure in the fluid distributing system exceeds a predetermined value, thus maintaining constant and substantially unvarying pressure in pipe 51. The valve 57 serves as a relief valve through which the building up of any additional pressure in the cylinder 16 is prevented by returning fluid to tank 55, in order to avoid loss of such fluid. The non-return valve 50 prevents any momentary excess pressure being transmited back to the pump 53 which, in the case of certain types, may be undesirable.

In the use of this invention the spring loading of the pressure regulating valve 59 is regulated so that the normal fluid pressure established in the cylinder 16 is sufficient to maintain the angle of attack of the ski 5 constant in relation to the body of the aircraft when the latter is in flight. Any pressure developed in the fluid distributing system, above that required to accomplish this purpose, is relieved to tank 55 through the pressure regulating valve 59. When the ski is in contact with the ground an angular displacement of the ski relative to the body or of the body relative to the ski takes place. The additional pressure which would be created in cylinder 16, due to the upward movement of cylinder 16 relative to piston 18, is immediately relieved to tank 55 through relief valve 57 so that substantially no additional stressing of the parts occurs.

The purpose of the spring 29 is to provide an emergency device to assist in retaining the ski 5 in its normal flight position in the event of failure of the fluid pressure system provided for this purpose. The spring is not essential to or a part of the said fluid pressure system.

Having thus described what I now consider to be the preferred embodiment of this invention it will be understood that various changes in the construction and arrangement and location of the parts may be resorted to within the scope and spirit of the invention as defined by the appended claims.

It may be pointed out, for example, that the hinged connection between each ski and the aircraft, as well as the manner of connecting the cylinder and piston devices to these parts, are features of construction which are subject to considerable variation in practice and need not necessarily be designed exactly as shown in the present drawing. It is also contemplated that various modifications may be resorted to with respect to the arrangement of the pipe connections provided between the cylinder and piston ski holding devices and the source of pressure to which these devices are connected. The cylinder and piston devices may also be replaced by equivalent pressure operating devices having excess pressure relief means associated therewith.

Having thus described my invention, what I claim is:

1. Landing gear for aircraft comprising a body member, a ski hingedly connected to said body member, a cylinder connected to one of said members, a piston working in said cylinder and connected to the other of said members, a pressure fluid supply tank, a pump having its intake side connected to said tank, a supply line connecting the pressure side of said pump to said cylinder and having a non-return valve therein, a pressure regulating valve connected between the discharge side of the pump and said tank at the pump side of the non-return valve and an excess pressure relief valve connected between the supply line and said tank at the cylinder side of the non-return valve.

2. Landing gear as set forth in claim 1 in which the supply line is connected to the cylinder through a hollow piston rod carried by said piston.

3. In an aircraft, landing gear comprising a ski, means connecting the ski to the body of the aircraft in a manner permitting movement of the ski to different angular positions in relation to said body, an extensible fluid pressure responsive device connected between the ski and body and adapted, when extended by fluid pressure, to position and unyieldingly hold the ski at a predetermined constant angle in relation to the body when the aircraft is in flight, and means for maintaining in said device a predetermined pressure substantially unvarying at different and changing angular displacements of the ski relative to the body of the aircraft.

4. In an aircraft, landing gear comprising a ski, means for hingedly connecting the ski to the body of the aircraft, a cylinder and piston device connected between said ski and body adapted, when extended by fluid pressure, to unyieldingly hold the ski at a predetermined flight angle in relation to the body when the aircraft is in flight, means for normally maintaining in said cylinder and piston device a predetermined and substantially unvarying fluid pressure sufficient to unyieldingly hold the ski at the proper flight angle, and means for preventing additional pressure building up in the said cylinder and piston device when relative movement of the cylinder and piston elements occurs due to changes in the angular relationship between ski and body when the ski is in contact with the ground.

5. Aircraft landing gear as set forth in claim 3, including resilient means adapted to hold the ski at a suitable flight angle in the event of failure of the fluid pressure or fluid pressure operated devices.

6. Aircraft landing gear as set forth in claim 3, including means for cushioning shocks which may occur as the limit of extension of the fluid pressure device described is reached.

7. An aircraft landing gear assembly as set forth in claim 4 in which the connection between the cylinder and piston device and the body of the aircraft comprises a trunnion member carried by said body, an extension of the cylinder and piston device passing slidably through an opening in said trunnion member and stops carried by the said extension engaging opposite sides of said trunnion member.

8. An aircraft landing gear assembly as set forth in claim 4 in which the connection between the cylinder and piston device and the body of the aircraft comprises a trunnion member carried by said body, an extension of the cylinder and piston device passing slidably through an opening in said trunnion member and stops carried by the said extension engaging opposite sides of said trunnion member, one of said stops including a cushioning device.

9. An aircraft landing gear assembly as set forth in claim 3 in which the last mentioned means comprises a source of constant fluid pressure, a pressure fluid supply tank, a pipe line supplying fluid under pressure to said fluid pressure responsive device and a pipe line returning fluid from said device to the said supply tank, said last mentioned pipe line including a pressure regulating relief valve through which excess pressure is relieved from said device to said tank.

10. An aircraft landing gear assembly as set forth in claim 3 in which the last mentioned means comprises a source of constant fluid pressure, a pressure fluid supply tank, a pipe line supplying fluid under pressure to said device and a pipe line returning fluid from said device to said supply tank, the pipe line furnishing fluid under pressure to said device being provided with a non-return valve and the pipe line returning fluid from the said device to the said supply tank being provided with an excess relief valve through which pressure fluid is returned directly from said device to said tank.

11. In an aircraft, landing gear comprising a ski, means connecting the ski to the body of the aircraft in a manner permitting movement of the ski to different angular positions in relation to said body, a fluid pressure responsive ski restraining device connected between the ski and said body and through which a predetermined and substantially unvarying fluid pressure is exerted against the ski to hold the latter at a predetermined constant angle in relation to the body when the aircraft is in flight and fluid pressure relief means associated with said restraining device to prevent any substantial increase in the ski restraining pressure exerted thereby due to changes in the angular relationship which takes place between the ski and the body when the ski is in contact with the ground.

ROBERT B. C. NOORDUYN.